Feb. 2, 1932.  M. FINCKE  1,843,152
DEVICE FOR EMPTYING GLASS MELTING POTS
Filed Oct. 10, 1929   2 Sheets-Sheet 1
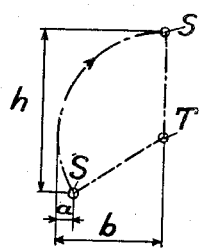
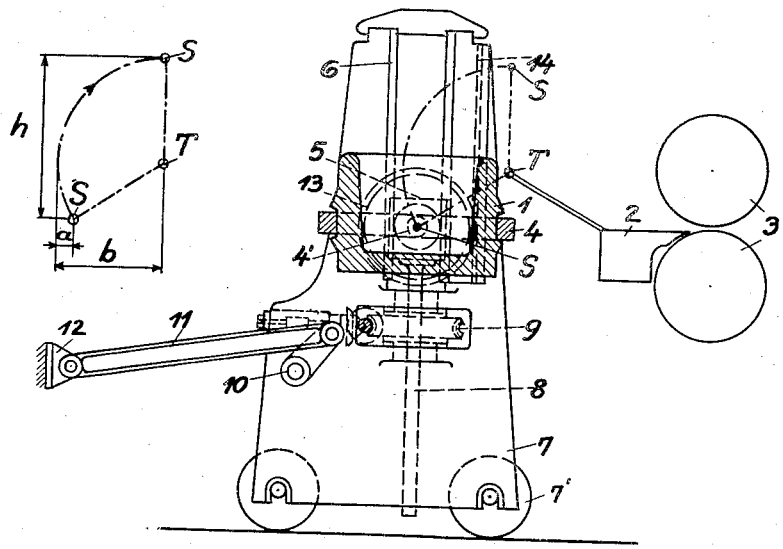
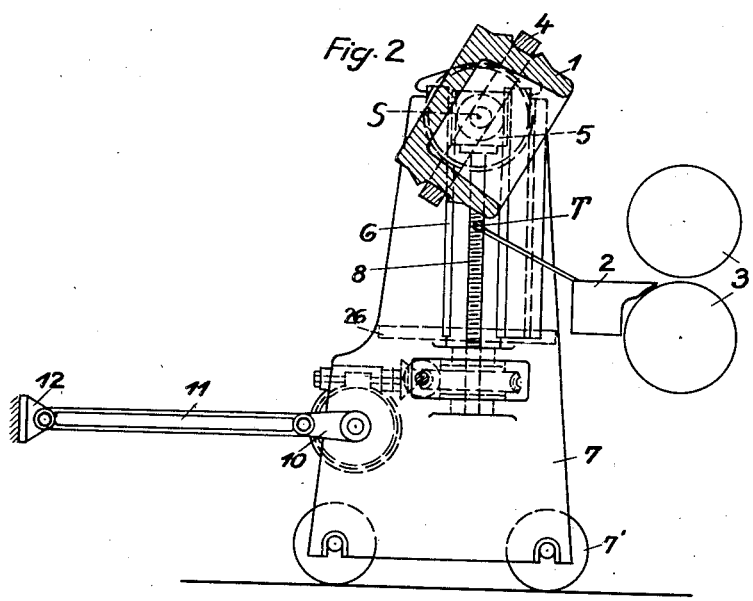
Inventor:
Michael Fincke

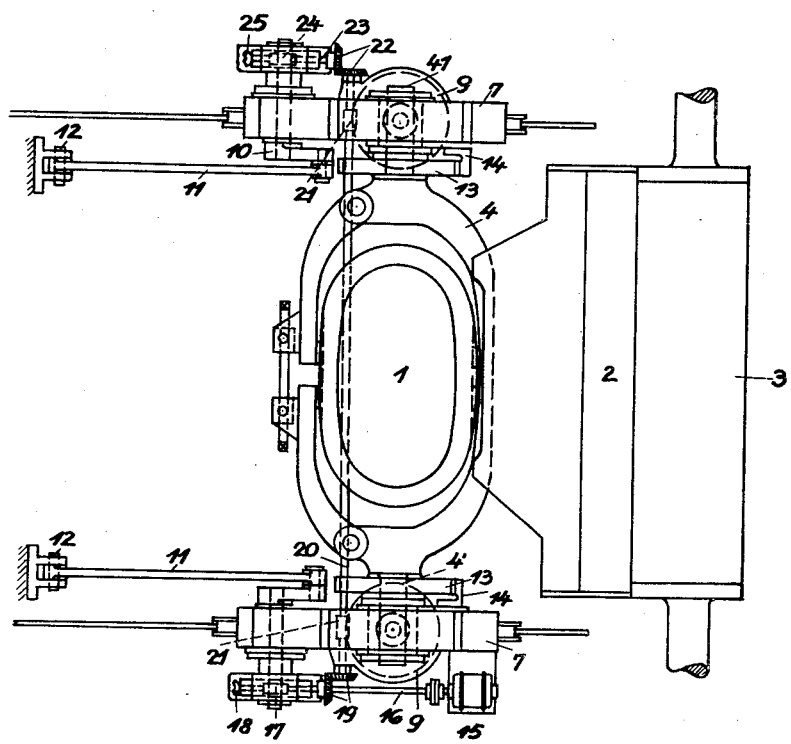

Patented Feb. 2, 1932

1,843,152

UNITED STATES PATENT OFFICE

MICHAEL FINCKE, OF AACHEN, GERMANY, ASSIGNOR, BY MESNE ASSIGNMENTS, TO THE AMERICAN BICHEROUX COMPANY, A CORPORATION OF DELAWARE

DEVICE FOR EMPTYING GLASS MELTING POTS

Application filed October 10, 1929, Serial No. 398,763, and in Germany August 2, 1929.

This invention relates to the manufacture of high grade plate glass by pouring molten glass from a pot onto a casting or rolling table or onto a receiver or roll of a glass rolling machine on which it is brought into shape, and it has more particularly reference to the mode of emptying the melting pot for the pouring out of the glass described in the patents to Max Bicheroux Nos. 1,673,098 and 1,673,138, according to which the pot is emptied "en masse" by positioning the pot near and aside of the table, receiver or other support and turning it as a whole about a horizontal axis located near the upper pouring edge of the pot and slightly above the support.

The invention has for its object to provide a modified form of device of simple and efficient construction for accomplishing this mode of emptying the pot. According to the invention, the tilting or turning movement of the pot is produced by a number of cooperative individual movements most of which are rectilinear, so that the torsional stresses which ordinarily occur in the known tilting devices—such as in cranked pot forks—and which are very injurious to the material, are reduced to a minimum.

An embodiment of the pot emptying device is illustrated in the accompanying drawings, in which:

Fig. 1 is a vertical section of the device with the pot in the initial position of the tilting movement, Fig. 2 is a similar section of the device with the pot in the terminal position of the tilting movement, Fig. 3 is a diagram of the several rectilinear movements from which results the turning movement of the pot about the tilting axis in emptying the pot, and Fig. 4 is a plan view of the device.

In the emptying of a glass melting pot by turning or tilting it about a horizontal axis situated in or near the pouring edge of the pot, the turning movement of the centre of gravity of the pot about the tilting axis can be decomposed into a number of rectilinear movements which are indicated in Fig. 3. Assuming S to be the centre of gravity of the pot and T the tilting axis, the turning movement of the former about the latter results from the vertical movement $h$, the horizontal movement $a$ towards the left and the horizontal movement $b$ towards the right. To complete the emptying movement the pot is rotated about the axis of gravity S.

In order to produce the tilting of the pot by the cooperation of the said individual movements, the device according to the invention is constructed as hereinafter described in detail.

In the embodiment illustrated, the tilting axis T of the pot 1 is shown to coincide with the edge of the rearward wall of the receiver 2 of a plate glass rolling machine 3. The tongs 4 which embrace the pot 1 in the plane of the centre of gravity as usual, have journals 4' which are situated in the axis of gravity of the pot and by which they are mounted in slide bearings 5, which are adapted to be moved vertically up and down in guides 6 of standards 7. The vertical movement of the bearings 5 is produced by means of threaded spindles 8 to which motion is imparted through nuts 9 which are rotatably mounted in the standards 7.

The standards 7 have wheels 7' to allow them to be moved towards and away from the machine 3. Such horizontal reciprocating movement is imparted to the standards by means of crank gears 10 which are mounted on the standards and the cranks of which are connected by links 11 with fixed pivot pins 12.

The pins 4' of the pot tongs have fastened on them pinions 13 meshing with rack bars 14 which are fixed on the standards 7 parallelly of the guides 6. When the bearings 5 are moved upwardly or downwardly by the spindles 8, the tongs 4 with the pot 1 rotate about the axis of gravity S towards the right or left hand owing to the pinions 13 rolling along and in engagement with the rack bars 14.

The combined movements, namely raising the slide bearings 5 through the spindles 8 by the height $h$, reciprocating the standards 7 through the crank drive 10, 11 by the distances $a$ and $b$, respectively, and rotating the pot 1 about S through the rack gear 13, 14, result in the desired tilting movement of the pot 1 around the axis T from the position according to Fig. 1 into the position according to Fig. 2. When the pot has been emptied, it can be returned to its initial position by an inverse movement of the several gearings.

The several gearings are preferably operated by a common motor 15 which is supported on one of the standards 7. The motor is coupled with a shaft 16 which drives one of the two cranks 10 by means of a worm gearing 17, 18. A pair of bevel wheels 19 transmits rotation from the shaft 16 to a transverse shaft 20. This shaft carries two worms 21 which are in engagement with the screw nuts 9 which are simultaneously formed as worm wheels. The shaft 20 through another pair of bevel wheels 22 drives a shaft 23 which in turn operates the crank 10 of the opposite standard through a worm gearing 24, 25.

Instead of the screws 8, the crank drives 10 and the rack gearings 13, 14 there may also be used any other mechanisms by which the same purpose can be attained.

The two standards 7 may either be separated from each other, as shown, or they may be rigidly connected to form one frame. The pots to be emptied are brought into the device by means of travelling transporting tables, endless conveyors or in any other suitable way.

As a modification there may also be provided between the standards 7 below the tongs 4 a supporting plate for the reception of the pots, such plate being indicated in Fig. 2 by dotted lines 26. A tilting device with such a supporting plate can be readily used for carrying the glass melting pots from the pot furnace to the rolling machine and back. In this case, it would only be necessary to make the links 11 easily detachable to allow the device to be quickly connected with and disconnected from the links.

Having thus described my invention, what I claim as new and desire to secure by Letters-Patent, is:—

In an apparatus for emptying glass pots, the combination with pot tongs, bearings therefor substantially in line with the center of gravity of the pot, vertical guides for the bearings, and means actuated from a common drive for lifting the bearings in the guides, turning the tongs in the bearings, and moving the bearings horizontally to turn the pot around an axis substantially co-incident with one of its lips.

In testimony whereof I have signed my name to this specification.

MICHAEL FINCKE.